United States Patent Office 3,708,310
Patented Jan. 2, 1973

3,708,310
PROCESSING OF SOYBEANS
Sam Kasakoff, New York, N.Y., assignor of a fractional part interest to Michael Ebert, New York, N.Y.
No Drawing. Filed May 6, 1970, Ser. No. 35,249
Int. Cl. A23l 1/20
U.S. Cl. 99—98                                                7 Claims

ABSTRACT OF THE DISCLOSURE

A process for rendering soy beans more palatable, the process involving treatment of the beans in a water solution containing papain, pectin and ascorbic acid. The soy beans are immersed for a period sufficient to permit absorption of the solution to a point close to saturation, after which the residual solution is drained and the saturated beans permitted to dry in air for a period sufficient to effect swelling thereof. The resultant soy beans may thereafter be roasted to provide a nut-like product.

BACKGROUND OF THE INVENTION

This invention relates to the processing of soy beans, and more particularly to a technique for rendering soy beans more palatable.

The soy bean is a leguminous plant native to tropical and warm-temperature regions of the Orient, where it has been cultivated as a principal crop for at least five thousand years. There are over two thousand varieties in cultivation, producing beans of many sizes, shapes and colors. In the Orient, they are used in multitudinous forms, such as soybean sauce, meal, vegetable oil, milk, cake, and as a coffee substitute. In the Occident, these and many other products are derived from soy beans.

Cultivation of soy beans, long confined mainly to China, has gradually spread to other countries. In the United States, they are now a leading crop. Soybean production in the United States increased from two hundred million bushels in 1947–1949, to nine hundred and thirty-one million in 1966.

The nutritional value of soybean products is well established, for soy is low in starch and high in proteins and minerals. Pound for pound, soy has twice as much protein as meat, four times more than eggs, and twelve times more than milk. Moreover, soy is a complete, balanced protein, far superior to other vegetable proteins. Soy protein, like that of animal origin, provides an efficient balance of the essential amino acids required by the body to build and repair cells and tissue. On the other hand, protein of vegetable origin, with the marked exception of the soy bean, is deficient in one or more of the essential amino acids, and is lacking, therefore, in body-building constituents.

The high quality of its protein makes soy bean products ideal in reducing diets. When complete in respect to amino acids, protein is efficiently utilized for growth, maintenance and other body functions. But when deficient in any one of the essential nutrients, as is the case for vegetables other than soy, protein is only partially utilized, and the unused portion tends to build fat, much the same as sugar and starch. In addition to its nutritive properties, soy improves foods in other ways, for it retards staling because of its hydrophilic property of absorbing and holding moisture.

In using soy in food, such as simulated hamburgers, there is a serious flavor problem, for natural soy has a distinctly bitter taste. While various methods are known for de-bittering soy beans, such as the Shellbarger process in which the beans are treated under vacuum using steam and hydrochloric acid, these processes involve a disintegration of the bean, so that the processed soy bean is in grit or flour form and is usable only in bread or in ground-meat mixtures.

SUMMARY OF THE INVENTION

In view of the foregoing, it is the primary object of this invention to provide a technique for treating soy beans to effectively de-bitter the bean and to render it more palatable without, however, destroying the physical integrity of the bean.

Also an object of the invention is to provide a process of the above type, which may be carried out at low cost and on a mass-production basis, the ingredients entailed being generally available and inexpensive, whereby the cost of the processed beans is not much greater than the cost of unprocessed soy beans.

Among the significant advantages of the invention are the following:

(A) Soy beans processed in accordance with the invention remain in bean form and may be canned and later consumed very much in the fashion of canned baked navy or pea beans, although unlike conventional baked beans, the processed soy beans have exceptional nutritional value.

(B) Processed soy beans may be roasted to impart texture and flavor thereto comparable to true nuts or fruit seeds, but with distinctly superior nutritional value. Thus the roasted soy bean may be consumed as roasted nuts.

(C) The processed soy beans in roasted form may be incorporated in comestibles to produce a confectionery and dietetic products having a markedly reduced caloric content and greatly enhanced protein value.

(D) The processed soy beans provide a highly palatable food capable of supplying adequate amounts of proteins to consumers who cannot tolerate meats by reason or allergies or on moral principles.

Briefly stated, these objects are attained in a technique in which soy beans are immersed in a water solution whose principal ingredients are papain, pectin and ascorbic acid, for a period sufficient for the soy beans to absorb and become saturated with these ingredients, after which excess solution is drained off and the saturated soy beans are exposed to the atmosphere for a period sufficient to permit the beans to swell as a result of cellular expansion. Thereafter the soy beans may be used directly in the manner of a baked-bean product, or roasted.

DESCRIPTION OF THE INVENTION

Though the invention is usable with all commercial varieties of soy bean, the choice of soy bean depends on taste considerations. Among the available varieties are the so-called "Kim," "Discoy," "Prize," "Magna" and "Amsoy" species. My present preference is for the "Amsoy" type, although I have had good results with other varieties.

In a process in accordance with the invention, a load of soy bean is immersed in a water solution whose principal ingredients are papain, ascorbic acid and pectin, for a period sufficient to effect saturation of the soy beans with these ingredients.

Papain is a proteolytic enzyme prepared from the latex of papaya fruit. The protease in the juice of unripe papaya is refined to produce a standardized product. In the dry state, this enzyme retains eighty-five percent to ninety percent of its potency for more than a year at normal room temperature. Heretofore, the main use for papain has been in the meat industry as a tenderizer, although some use is made of papain in medicine. In the present invention, the enzyme action of papain effects both tenderizing and de-bittering, and also renders the soybeans sensitive to subsequent flavoring.

Ascorbic acid and Vitamin C are the two names by which L-xyloascorbic acid is commonly known. It is available commercially under numerous trade names. Ascorbic acid is in the form of off-white or white crystals, odorless, and with a mild acidic taste. Sodium ascorbate, which, in the context of the present invention, is a functional equivalent to ascorbic acid, is in the form of white to slightly yellow crystals, powders and fine granules. The chief function of ascorbic acid is in regulating the oxidation process in the living cell. It also has important physiological effects in connection with resistance to bacterial infections and toxins. However, its uses are not restricted to biological effects, and it has found extensive use as an antioxidant in soft drinks and in the prevention of off-flavors in frozen fruits.

In the present invention, the ascorbic acid (or sodium ascorbate) functions as an antioxidant to extend the shelf-life of the processed soybean product. Also, when the soybean product is contained in vacuum-type packages, the antioxidant action of the ascorbic acid removes oxygen residue from the packages.

Pectins are water-soluble pectinic acids of varying methyl ester content and degree of neutralization, which are capable of forming gels with sugar and acid under suitable conditions. Commercial preparations of pectin are available for jelly-making. In the context of the present invention, the soybean, whose fibers are tenderized by the papain, reacts with the pectin to produce, without cooking and the resultant loss of potency, a soybean whose consistency and texture are similar to that of conventional navy beans, but whose flavor is relatively neutral and free of bitterness. The natural taste of the processed soybean may be modified by adding flavoring agents in the manner to be hereafter described.

In one preferred technique in accordance with the invention, the following formula was used:

Water: approximately twelve gallons
Papain: 10 grams
Ascorbic acid: 25 grams
Pectin: 50 grams
Burnt sugar solution: 300 grams The above solution, after the ingredients therein are fully dissolved, is used to soak one hundred pounds of soybeans for a period sufficient for the beans to absorb the solution and to become substantially saturated thereby. It has been found that after five hours of immersion, the soybeans have absorbed about ninety-five percent of the solution.

At this stage, the excess solution is drained from the beans, and the beans exposed to the atmosphere for about three hours. During the exposure period, most of the surface moisture evaporates and at the same time, the beans, in reacting with the ingredients absorbed therein, proceed to swell. The function of the burnt sugar or caramel in the solution is to add flavor to the beans, and also to react with the pectin to promote jelling.

The wet-processed beans at this stage (that is, after drying), have the physical properties of pea or navy beans, and may be packaged as such for consumption in that form. However, the wet-processed beans may be further processed to produce a roast-bean product. When properly roasted under direct heat, the dry-processed bean has a nut-like consistency and flavor, especially adapted for the modern palate.

Roasting is best carried out in a rotary drum under direct heat. It is important that roasting be effected under proper conditions of time and temperature. This is established empirically by roasting until the beans attain a light-brown color, with the entire bean being crisp and flavorful. A roasting time of twenty minutes at a temperature of about 400° F., is generally adequate for this purpose. The temperature level must be adjusted to avoid scorching of the beans. The roasting process may be accelerated by the use of a heated vacuum chamber, being sure to vent off the moisture of the beans.

To further enhance the flavor of the beans, the drying which takes place immediately after soaking is carried out in an enclosure whose atmosphere contains aromatic oils or other flavoring agents. These agents in the course of drying, are absorbed in the soy beans and become entrapped therein, imparting to the beans the flavor of the agent. One cannot obtain this effect by including the flavoring agent in the soaking solution, for the bean is the not receptive.

Soy beans which are processed and roasted in accordance with the invention, may be eaten directly as nuts, or candy-coated or otherwise incorporated in candy bars and brittle, to impart a high protein and mineral content thereto. Also, it may be crushed and added to peanut butter or to other food products.

While there has been described a preferred form of processed soy bean in accordance with the invention, it will be appreciated that many changes and modifications may be made therein without, however, departing from the essential spirit of the invention.

I claim:

1. A process of treating soy beans to render them more palatable, said process comprising the steps of:
   (A) soaking a charge of soy beans in a water solution including a tenderizing agent in the form of papain and a gelling agent in the form of pectin, for a period sufficient to substantially saturate the soy beans,
   (B) draining the excess solution from the soaked soy beans to produce wet-processed soy beans, and
   (C) exposing the wet-processed soy beans in an atmosphere for a period sufficient to permit the soy beans to swell and to effect partial drying thereof.

2. A process as set forth in claim 1, further including an antioxidant in said solution.

3. A process as set forth in claim 2, wherein said antioxidant is ascorbic acid.

4. A process as set forth in claim 1, wherein a volatile flavoring agent is contained in the atmosphere in which the processed soy beans are exposed.

5. A process as set forth in claim 4, wherein said flavoring agent is burnt sugar.

6. A process as set forth in claim 1, wherein the amount of papain is less than one gram per gallon of water.

7. A process as set forth in claim 1, further including the step of heating the partially dried soy beans to effect roasting thereof.

References Cited

UNITED STATES PATENTS

| | | | |
|---|---|---|---|
| 2,795,502 | 6/1957 | Raymond | 99—98 |
| 3,220,851 | 11/1965 | Rambaud | 99—98 |

A. LOUIS MONACELL, Primary Examiner

W. A. SIMON, Assistant Examiner